United States Patent
Ionita et al.

(10) Patent No.: US 12,034,905 B2
(45) Date of Patent: Jul. 9, 2024

(54) MULTIFOCAL DISPLAY DEVICE AND METHOD

(71) Applicant: Huawei Technologies Co., Ltd., Shenzhen (CN)

(72) Inventors: Bogdan Cihodariu Ionita, Munich (DE); Atanas Boev, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/561,429

(22) Filed: Dec. 23, 2021

(65) Prior Publication Data

US 2022/0124297 A1     Apr. 21, 2022

Related U.S. Application Data

(63) Continuation of application No. PCT/EP2019/067144, filed on Jun. 27, 2019.

(51) Int. Cl.
  *H04N 13/144*     (2018.01)
  *H04N 13/344*     (2018.01)

(52) U.S. Cl.
  CPC ......... *H04N 13/144* (2018.05); *H04N 13/344* (2018.05)

(58) Field of Classification Search
  CPC ... H04N 13/144; H04N 13/344; H04N 13/322
  (Continued)

(56) References Cited

U.S. PATENT DOCUMENTS

2014/0376775 A1*  12/2014  Datta ................... H04N 13/264
                                                            382/103
2016/0147078 A1    5/2016  Bedard et al.
(Continued)

FOREIGN PATENT DOCUMENTS

WO        2019011447 A1      1/2019

OTHER PUBLICATIONS

Hu et al., "Design and Assessment of a Depth-Fused Multi-Focal-Plane Display Prototype," Journal of Display Technology, vol. 10, No. 4, XP011545072, total 9 pages (Apr. 2014).
(Continued)

*Primary Examiner* — Tung T Vo
(74) *Attorney, Agent, or Firm* — Leydig, Voit & Mayer, Ltd.

(57) ABSTRACT

The present invention provides a device comprising circuitry configured to obtain a plurality of initial two-dimensional, 2D, images which together represent an initial three-dimensional, 3D, image, wherein each initial 2D image is associated with one of a plurality of focal planes. The device is further configured to generate one or more blurred versions of each of the initial 2D images on one or more of the focal planes other than its associated focal plane; generate a high passed version of each of the initial 2D images on its associated focal plane; and generate a plurality of final 2D images by generating for each focal plane a final 2D image based on the high passed version of the initial 2D image associated with that focal plane and one or more blurred versions generated on that focal plane from one or more of the other initial 2D images.

11 Claims, 13 Drawing Sheets

(58) Field of Classification Search
USPC .......................................................... 348/43
See application file for complete search history.

(56) References Cited

U.S. PATENT DOCUMENTS

| | | | | |
|---|---|---|---|---|
| 2017/0061635 | A1* | 3/2017 | Oberheu | G06T 11/60 |
| 2020/0380651 | A1* | 12/2020 | Wolfe | G06T 5/40 |
| 2021/0136354 | A1* | 5/2021 | Valli | G02B 27/017 |
| 2021/0185303 | A1* | 6/2021 | Valli | H04N 13/398 |
| 2021/0235067 | A1* | 7/2021 | Valli | H04N 13/366 |
| 2022/0053133 | A1* | 2/2022 | Wang | H04N 23/6811 |
| 2022/0174261 | A1* | 6/2022 | Hornstein | G06T 7/33 |

OTHER PUBLICATIONS

Texas Instruments Incorporated, "DLP® Technology for Near Eye Display-White Paper," total 17 pages (Sep. 2014).

Kramida, "Resolving the Vergence-Accommodation Conflict in Head-Mounted Displays," in IEEE Trans. on Visualization and Computer Graphics, vol. 22, No. 7, pp. 1912-1931 (Jul. 2016).

"Fast Electrically Tunable Lens, EL-10-30-Series," Datasheet: EL-10-30-Series, Optotune, total 16 pages (Jan. 2017).

Shibata et al., "The zone of comfort: Predicting visual discomfort with stereo displays," in J. Vis. 2011 ; 11(8): 11. doi:10.1167/11.8.11., total 53 pages (Jul. 2011).

Lambooij et al., "Visual Discomfort and Visual Fatigue of Stereoscopic Display: A Review," in Journal of Imaging Science and Technology, vol. 53, No. 3, total 14 pages (2009).

Wu et al., "Content-Adaptive Focus Configuration for Near-Eye Multi-Focal Displays," in IEEE Intl. Conf. on Multimedia and Expo (ICME), total 6 pages (Jul. 2016).

Narain et al., "Optimal Presentation of Imagery with Focus Cues on Multi-Plane Displays," in ACM Trans. on Graphics, vol. 34, No. 4, Article 59, total 12 pages (Aug. 2015).

Anonymous, "TI training and videos," Applications and designs, Retrieved from the internet:http://www.ti.com/general/docs/video/watch.tsp?entryid=5157963226001.on Mar. 18, 2020. total 2 pages.

Sommerich, "How DLP works," Tutorial, in AV Asia Pacific Magazine, pp. 64-65 (2009).

"Principles of Time Domain Imaging," Forth Dimension Displays Limited, total 19 pages (Dec. 19, 2013).

\* cited by examiner

MULTIFOCAL DISPLAY DEVICE AND METHOD

CROSS-REFERENCE TO RELATED APPLICATIONS

This application is a continuation of International Application No. PCT/EP2019/067144, filed on Jun. 27, 2019, the disclosure of which is hereby incorporated by reference in its entirety.

TECHNICAL FIELD

The present embodiments relate to a Multifocal Display (MFD) device and a corresponding method for providing a multifocal display. The MFD device of the present embodiments can be used for a Near Eye Display (NED) device, or a Near-To-Eye (NTE) application or device, or a Head Mounted Display (HMD) device. In particular, the embodiments relate to image flickering mitigation of such an MFD device.

BACKGROUND

MFD devices have recently received increasing attention in industry, due to their ability to create a small and portable personal viewing experiment. MFD devices may be applied in the category of Augmented Reality (AR), which typically utilizes a See-Through NED device, and in the category of Virtual Reality (VR), which typically utilizes an Immersive NED device.

An exemplary MFD device (here particularly an exemplary NED device) is shown in FIG. 12. In order to create a three-dimensional (3D) impression, a viewing distance of a single 2D display from the eye of a user is rapidly switched in synchronization with the rendering of frames of multiple focal planes, in order to create an ideally flicker-free perception.

One key requirement for such a MFD device, particularly to switch the viewing distance of the 2D display, is a high-speed focal modulator element, which may utilize a focus tunable lens, in order to continually adjust/modulate the focal length or optical power of the lens. The MFD device of FIG. 12 further includes an ultrafast display element, which comprises, for instance, a Digital Micromirror Device (DMD) or a Liquid Crystal on Silicon (LCOS), e.g., a Ferroelectric LCOS (FCLOS). Such a display element is used to sequentially display color images at a flicker fusion threshold speed of at least 60 Hz frame rate. Both the display element and the focus tunable lens of the focal modulator element are controlled by a controller of the MFD device.

In the time-multiplexed MFD, an image which corresponds to a certain depth is played sequentially at its exact focal plane as illustrated in FIG. 13. An image sequence I0, I1, I2, I3, which corresponds to a certain depth (or focal plane) sequence represented by a staircase function (of optical power), is sequentially played within a time period of 1/60 s. FIG. 13 shows how different focus planes (here also four focal planes of different indices 1 to 4 are illustrated) are controller over time (x-axis). The optical power D of the focus tunable lens is plotted in FIG. 13 (on the y-axis), and may be adjusted by applying a control signal of changing value. For example, a signal of changing current intensity may be applied to change focal planes (optical power), one current intensity for each optical power of the lens. Accordingly, for generating optical power steps (jumps between two focal planes), in order to rapidly change between different focal planes, a control signal in the form of a current step is preferably applied.

However, such a MFD device has the disadvantage of creating image flickering, for example, the image flickering problem may occur due to change of the intensity, etc. Moreover, the eye sensitivity to flicker is a function of both frequency and amplitude. The image flickering problem in the MFD device may be solved, for example, by a system capable of having a higher frame rate, i.e., much higher than 60 FPS. However, such a system may become costly and require a higher power consumption.

SUMMARY

In view of the above-mentioned problems and disadvantages, the present embodiments provide improved devices and methods. An objective is in particular provide a device and a method that mitigate the image flickering problem, i.e. the flicker should become less visible or should be eliminated.

The objective is achieved by the embodiments provided in the enclosed independent claims. Advantageous implementations of the embodiments are further defined in the dependent claims.

A first aspect provides a device comprising circuitry configured to obtain a plurality of initial two-dimensional, 2D, images which together represent an initial three-dimensional, 3D, image, wherein each initial 2D image is associated with one of a plurality of focal planes; generate one or more blurred versions of each of the initial 2D images on one or more of the focal planes other than its associated focal plane; generate a high passed version of each of the initial 2D images on its associated focal plane; and generate a plurality of final 2D images by generating for each focal plane a final 2D image based on the high passed version of the initial 2D image associated with that focal plane and one or more blurred versions generated on that focal plane from one or more of the other initial 2D images.

The device comprising the circuitry may be or may be incorporated in the MFD. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

The device of the first aspect may reduce perceived flicker artifact on the MFD. The flicker artifact may be reduced, for example, based on applying inter focal plane filtering. Moreover, the device (e.g., the MFD) may reduce the contrast between at least two successive focal plane images.

In an implementation form of the first aspect, a superposition of the plurality of final 2D images is visually identical or similar to a superposition of the plurality of initial 2D images.

In a further implementation form of the first aspect, the one or more blurred versions of a determined initial 2D image are generated by applying an inter focal plane filtering in order to reduce the contrast between at least two generated final 2D images associated with successive focal planes.

In a further implementation form of the first aspect, the high passed version of a determined 2D image associated with its determined focal plane is generated based on the generated one or more blurred versions of the determined 2D image.

This is beneficial, since it takes into account an intensity conversion, for example, the high passed versions of an image may be generated based on the one or more blurred versions of the image. Moreover, since the intensity may be converted, the flickering may be less visible.

In a further implementation form of the first aspect, the device is further configured to identify an object in an initial 2D image associated with a given focal plane; and generate the final 2D image for the given focal plane by using the high passed version of the initial 2D image for the area corresponding to the object, and further using the one or more blurred versions generated from the one or more of other initial 2D images for the area outside of the object.

For example, the object in the initial 2D image may be identified, which may be a bright object having a predefined intensity. Moreover, the final 2D image may be generated such that the intensity of the area corresponding to the object is reduced (e.g., compared to the intensity of the area corresponding to the object in the initial 2D image), and the intensity of the area the area outside of the object may be increased (e.g., compared to the intensity of the area outside of the object in the initial 2D image). Hence, the image flickering may be reduced, less visible, etc.

In a further implementation form of the first aspect, the device is further configured to display sequentially the generated final 2D images, each being displayed at its associated focal plane, wherein the final 2D images together representing a final 3D image.

This is beneficial, since a final 3D image may be generated (e.g., displayed) which may have less image flickering compared to the initial 3D image.

In a further implementation form of the first aspect, the device is further configured to generate the plurality of initial 2D images based on the initial 3D image.

In a further implementation form of the first aspect, the device is further configured to determine a depth map based on the initial 3D image.

In a further implementation form of the first aspect, the device is further configured to generate, based on the depth map, a plurality of masks, each mask being associated with one of the plurality of focal planes, and generate the plurality of initial 2D images based on applying the plurality of masks on the initial 3D image.

A second aspect provides a method comprising obtaining a plurality of initial two-dimensional, 2D, images which together represent an initial three-dimensional, 3D, image, wherein each initial 2D image is associated with one of a plurality of focal planes; generating one or more blurred versions of each of the initial 2D images on one or more of the focal planes other than its associated focal plane; generating a high passed version of each of the initial 2D images on its associated focal plane; and generating a plurality of final 2D images by generating for each focal plane a final 2D image based on the high passed version of the initial 2D image associated with that focal plane and one or more blurred versions generated on that focal plane from one or more of the other initial 2D images.

In an implementation form of the second aspect, a superposition of the plurality of final 2D images is visually identical or similar to a superposition of the plurality of initial 2D images.

In a further implementation form of the second aspect, the one or more blurred versions of a determined initial 2D image are generated by applying an inter focal plane filtering in order to reduce the contrast between at least two generated final 2D images associated with successive focal planes.

In a further implementation form of the second aspect, the high passed version of a determined 2D image associated with its determined focal plane is generated based on the generated one or more blurred versions of the determined 2D image.

In a further implementation form of the second aspect, the method further comprises identifying an object in an initial 2D image associated with a given focal plane; and generating the final 2D image for the given focal plane by using the high passed version of the initial 2D image for the area corresponding to the object, and further using the one or more blurred versions generated from the one or more of other initial 2D images for the area outside of the object.

In a further implementation form of the second aspect, the method further comprises displaying sequentially the generated final 2D images, each being displayed at its associated focal plane, wherein the final 2D images together representing a final 3D image.

In a further implementation form of the second aspect, the method further comprises generating the plurality of initial 2D images based on the initial 3D image.

In a further implementation form of the second aspect, the method further comprises determining a depth map based on the initial 3D image.

In a further implementation form of the second aspect, the method further comprises generating, based on the depth map, a plurality of masks, each mask being associated with one of the plurality of focal planes, and generating the plurality of initial 2D images based on applying the plurality of masks on the initial 3D image.

A third aspect provides a computer program comprising program code causing a computer to perform the method according to the second aspect when being carried out on a computer.

A fourth aspect provides a non-transitory computer-readable recording medium that stores therein a computer program which, when executed by a processor, causes the method according to the second aspect to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which FIG. 1 schematically illustrates a device comprising circuitry according to an embodiment of the invention.

DETAILED DESCRIPTION OF EMBODIMENTS

Figure 1:
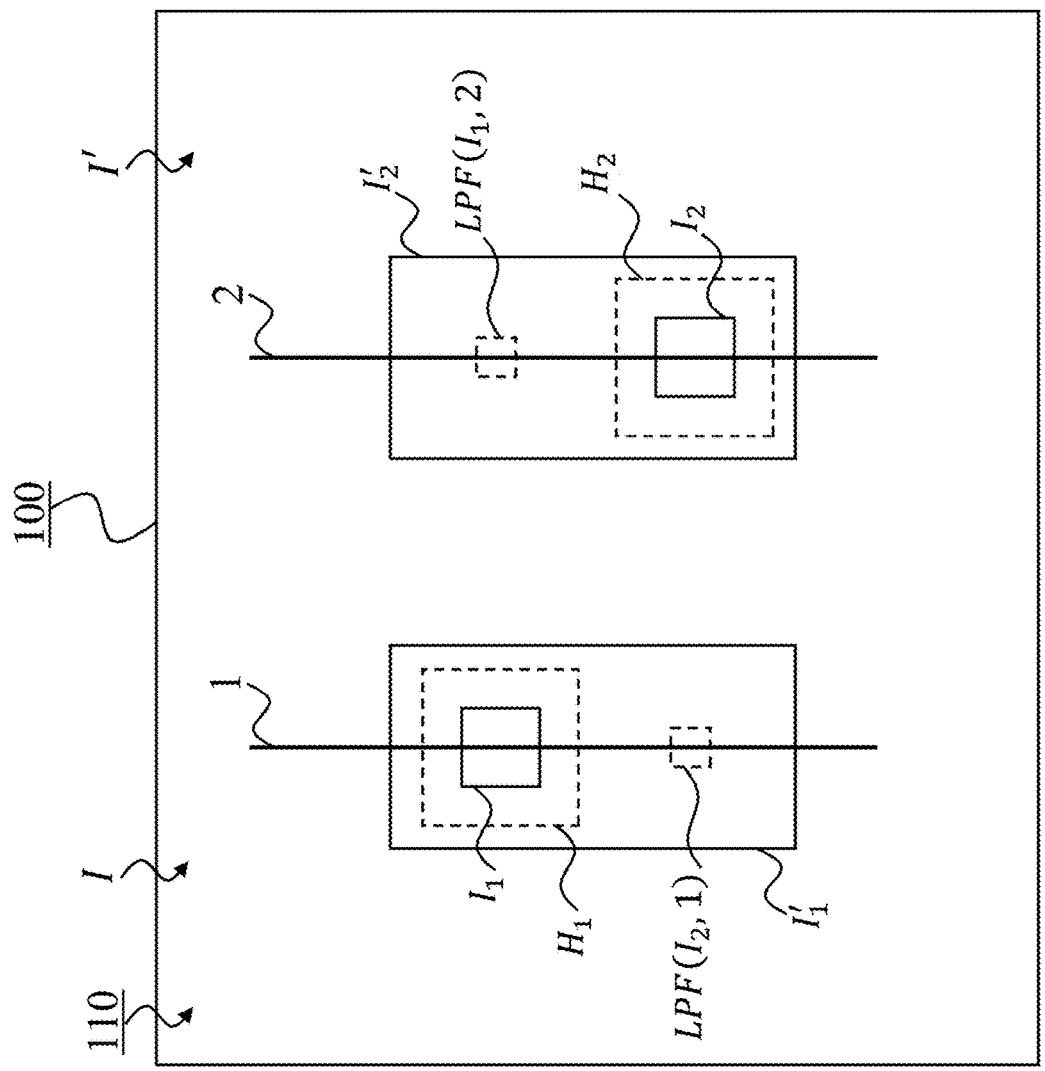

FIG. 1 schematically illustrates a device 100 comprising circuitry 110, according to an embodiment of the invention.

The device 100 comprising circuitry 110 is configured to obtain a plurality of initial two-dimensional (2D) images $I_1$ and $I_2$, which together represent an initial three-dimensional (3D) image I, wherein each initial 2D image $I_1$, $I_2$ is associated with one of a plurality of focal planes 1, 2.

The device 100 is further configured to generate one or more blurred versions $LPF(I_1, 2)$, $LPF(I_2, 1)$ of each of the initial 2D images $I_1$, $I_2$ on one or more of the focal planes 1, 2, other than its associated focal plane 1, 2.

The device 100 is further configured to generate a high passed version $H_1$, $H_2$ of each of the initial 2D images $I_1$, $I_2$ on its associated focal plane 1, 2.

The device 100 is further configured to generate a plurality of final 2D images $I'_1$, $I'_2$, by generating for each focal plane 1, 2 a final 2D image $I'_1$, $I'_2$ based on the high passed version $H_1$, $H_2$ of the initial 2D image $I_1$, $I_2$ associated with that focal plane 1, 2 and one or more blurred versions $LPF(I_1, 2)$, $LPF(I_2, 1)$ generated on that focal plane 1, 2 from one or more of the other initial 2D images $I_1$, $I_2$.

The device 100 comprising the circuitry 110 may be, or may be incorporated, in an MFD device. The device 100 may reduce the perceived flicker artifact on the MFD of the MFD device. The flicker artifact may be reduced, for example, based on applying inter focal plane filtering. Moreover, the device (e.g., the MFD device) may generate the final 2D image such that it may reduce the contrast between at least two successive final 2D images compared to the two initial 2D images, etc.

Figure 2:
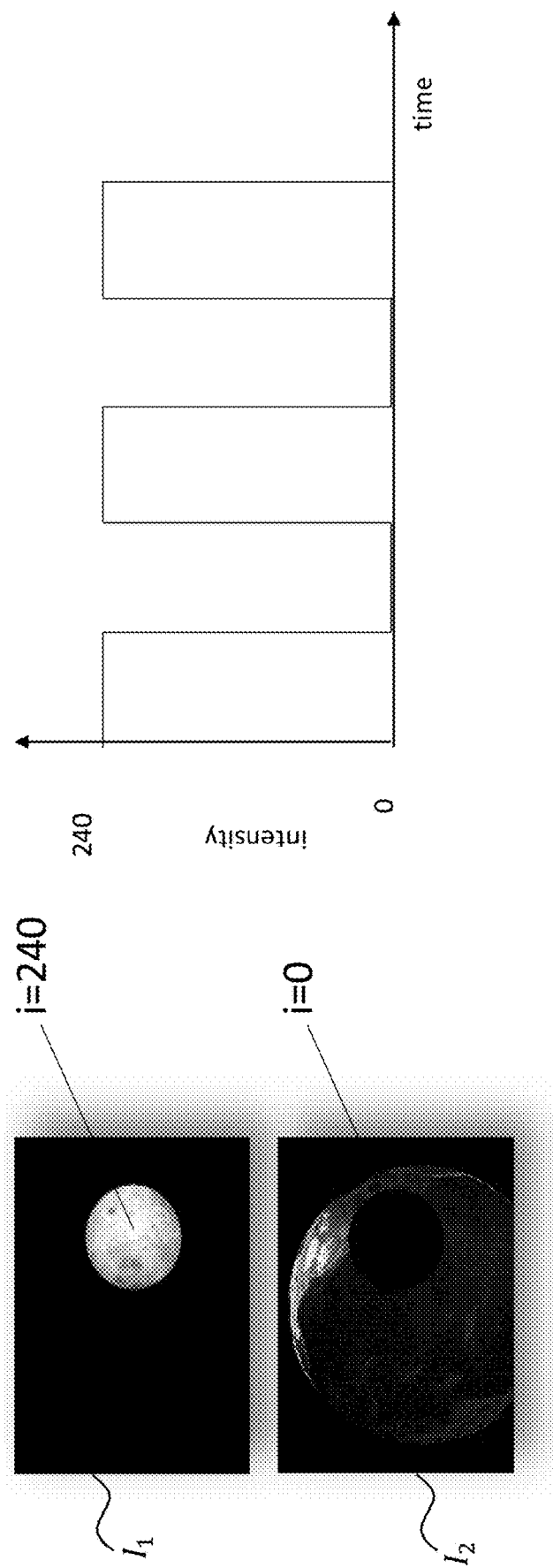
FIG. 2 illustrates a formation of visible flicker due to variation of intensity.

FIG. 2 illustrates formation of visible flicker due to variation of intensity amplitudes. Generally, the eye sensitivity to flicker is a function of both frequency and amplitude. In case of a bright object, the intensity amplitude is large and flicker becomes visible even at 60 FPS. An illustration of such a case is shown in FIG. 2, in which an object in the initial 2D image $I_1$ has an intensity amplitude of 240, and an object in the initial 2D image $I_2$ has an intensity amplitude of 0. Moreover, variation of the intensity amplitudes from 240 to 0 (e.g., from one initial image to the other initial image) generates visible flicker.

Figure 3:
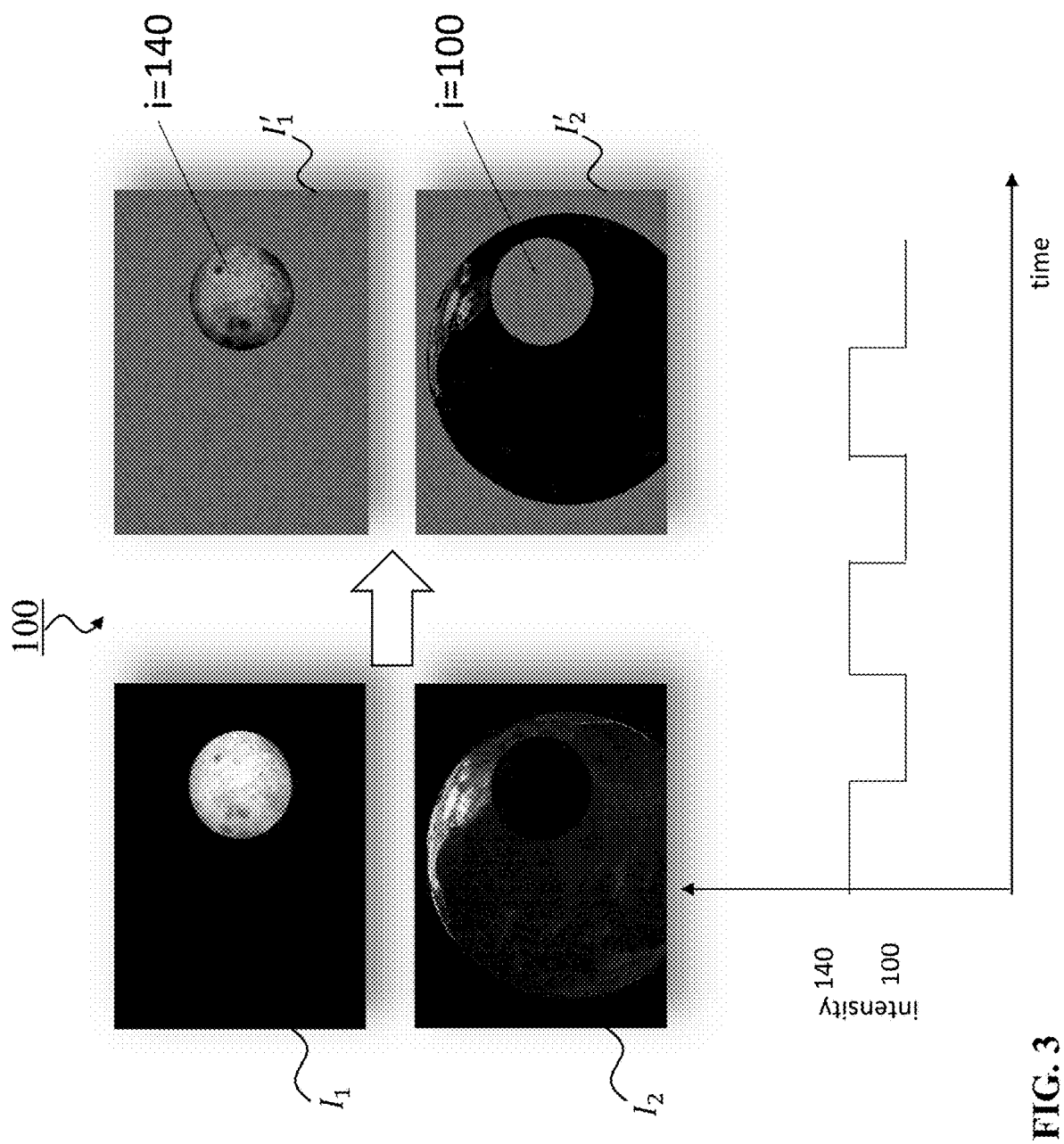
FIG. 3 illustrates the generating of two final 2D images for two focal planes according to various embodiments of the invention.

FIG. 3 illustrates generating two final 2D images for two focal planes, according to various embodiments of the invention. For example, the device 100 (e.g., its circuitry 110) may generate the two final 2D image $I'_1$, $I'_2$ from the two initial 2D images $I_1$, $I_2$.

For example, the device 100 may generate the two final 2D image $I'_1$, $I'_2$ by means of signal processing, particularly by distributing pixel values across the focal plane images (layers), in order to decrease the amplitude change in consecutive images in the MFD. Thus, the flicker may become less visible, and the frame rate and the power consumption may not need to be increased. The intensity sum of all focal plane images may remain the same, so the eye perceives the same compound image.

In FIG. 3, the two initial 2D images $I_1$, $I_2$ are identical to the ones shown in FIG. 2, and therefore, the object in the initial 2D image $I_1$ has an intensity amplitude of 240 and the object in the initial 2D image $I_2$ has the intensity amplitude of 0.

Moreover, the device 100 generates the two final 2D image $I'_1$, $I'_2$ in which the object in the final 2D image $I'_1$ has an intensity amplitude of 140 and the object in the final 2D image $I'_2$ has the intensity amplitude of 100.

The reduced variation of the intensity amplitudes from 140 to 100 (e.g., from the final image $I'_1$ to the final 2D image $I'_2$ may generate no flicker, or it may generate at least flicker which is less visible.

Figure 4:
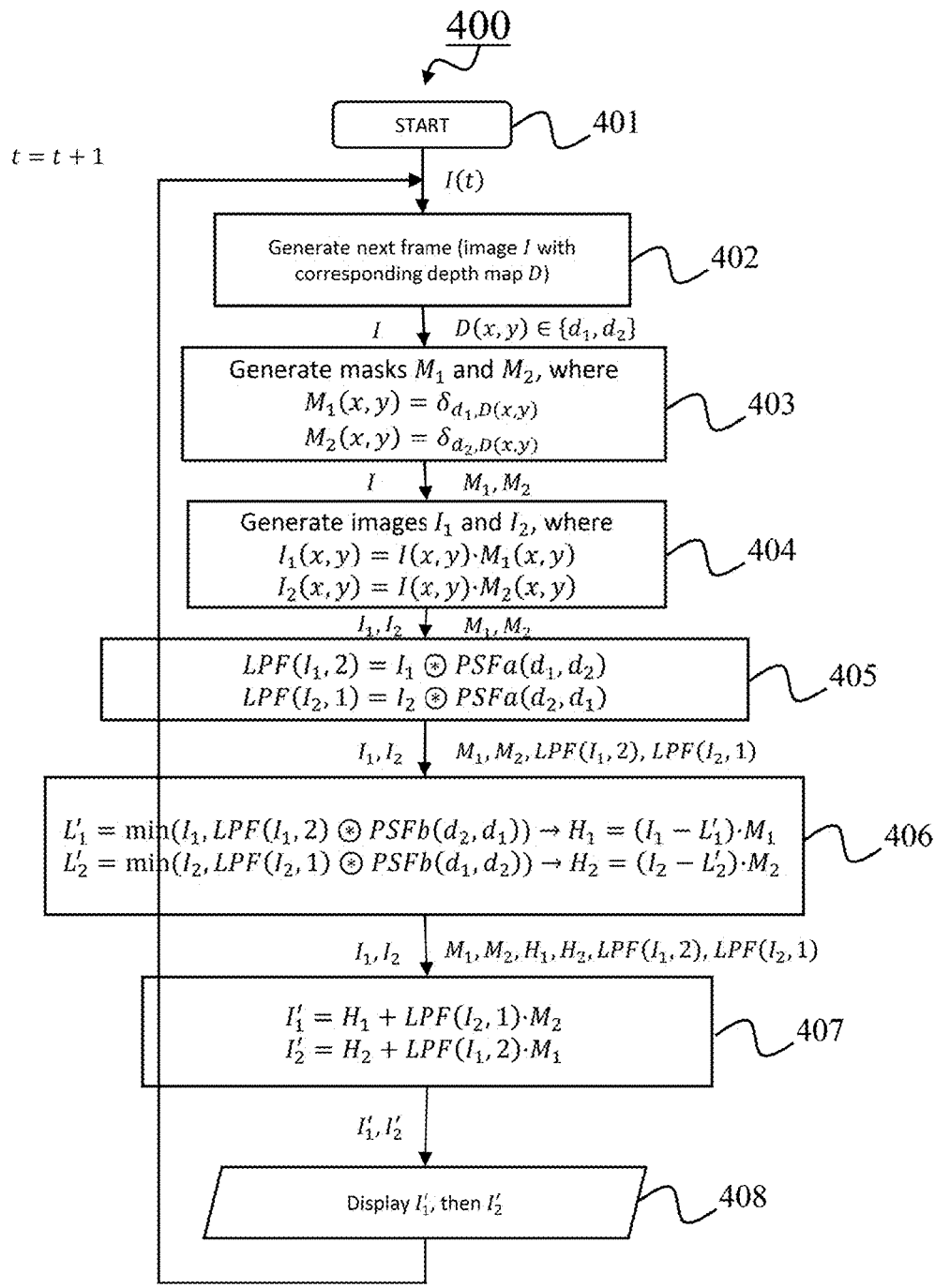
FIG. 4 schematically illustrates a flowchart of a method according to an embodiment of the invention.

FIG. 4 schematically illustrates a flowchart of a method 400 according to an embodiment of the invention. The method 400 may be carried out by the device 100, as it is described above. The method 400 indicates a general flowchart of inter focal plane filtering given two initial 2D images (also referred to as focal plane images).

At 401, the device 100 (e.g., its circuitry 100) starts the method 400 of inter focal plane filtering.

At 402, the device 100 (e.g., its circuitry 100) obtains the depth map $D(x, y) \in \{d_1, d_2\}$ from the initial 3D image I.

At 403, the device 100 calculates the non-overlapping masks $M_1$, $M_2$ for all focal planes 1, 2.

At 404, the device 100 generates the initial 2D images (also referred to the focal plane images) $I_1$, $I_2$ after applying the masks $M_1$, $M_2$. For example, the device 100 may apply the masks $M_1$, $M_2$ on the initial 3D image I and generate the initial 2D images $I_1$, $I_2$.

At 405, the device 100 generates one or more blurred versions $LPF(I_1, 2)$, $LPF(I_2, 1)$ of the initial 2D images (i.e., target focal plane images) $I_1$, $I_2$ respectively, on the other focal planes (also hereinafter referred to intermediate focal plane images). The LPF is the low pass filter function.

At 406, the device 100 generates the high passed version $H_1$, $H_2$ of each of the initial 2D images $I_1$, $I_2$. This takes into account intensity conservation since the process involves other intermediate focal plane images, i.e., the one or more blurred versions of other initial 2D images $LPF(I_1, 2)$, $LPF(I_2, 1)$. For example, the device 100 may obtains the point spread function (PSF), and it may further generate the high passed versions.

At 407, the device 100 generates two final 2D images $I'_1$, $I'_2$ to be displayed on the corresponding focal planes.

For example, the final 2D image of a given focal plane contains the high passed version of its own image (i.e., the high passed version of the initial 2D image associated with that focal plane) and the one or more blurred versions generated on that focal plane from one or more of the other initial 2D images (i.e., the intermediate focal plane images generated by the other initial 2D images).

At 408, the device 100 displays the final images sequentially.

Moreover, the device 100 may further proceed to step 402 and further generate the initial 2D images and the corresponding final images for the next frame corresponding with the time t+1.

Figure 5:
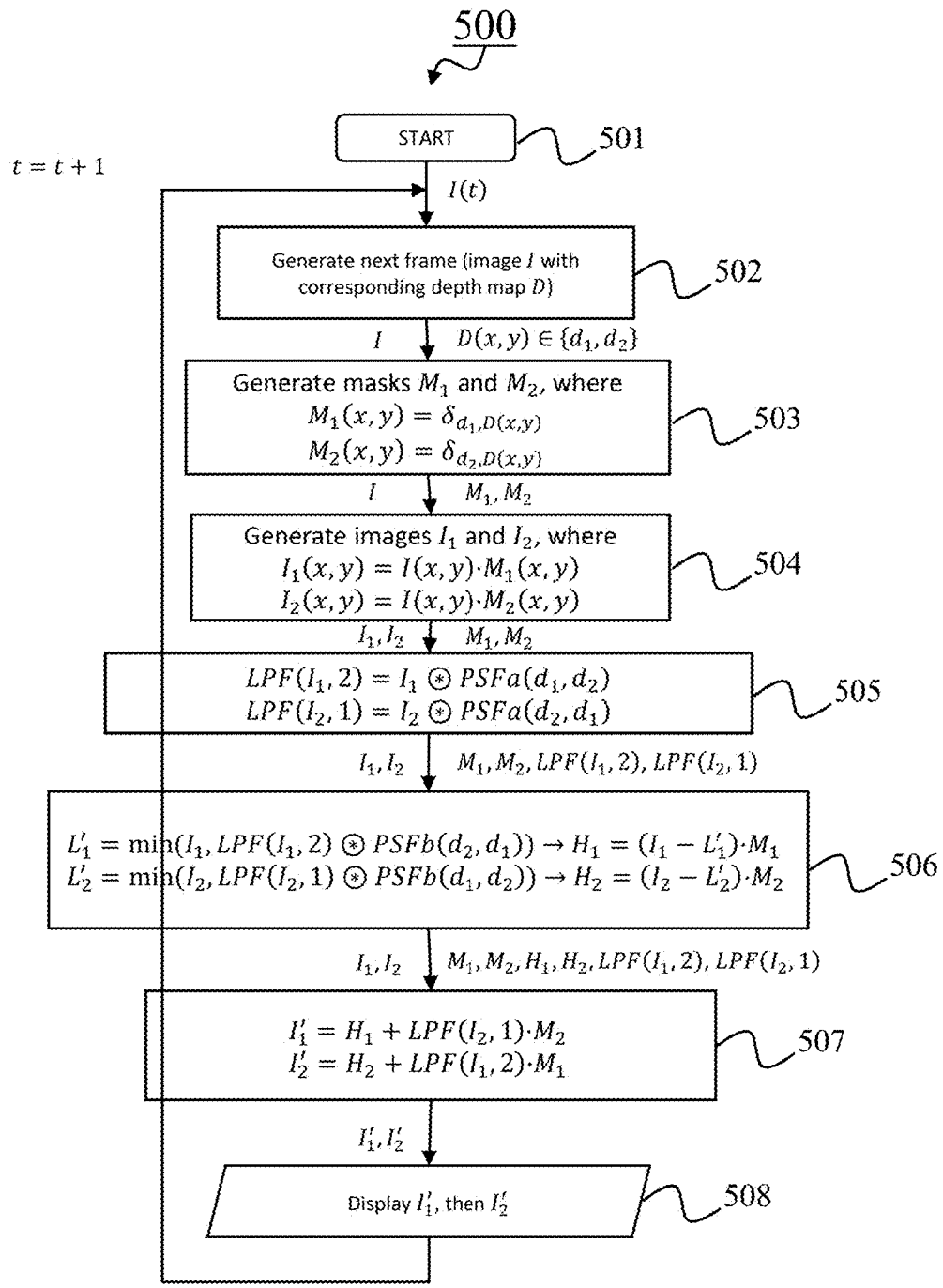
FIG. 5 schematically illustrates a flowchart of a method according to an embodiment of the invention.

FIG. 5 schematically illustrates a flowchart of a method 500 according to an embodiment of the invention. The method 500 may be carried out by the device 100, as it is described above. In FIG. 5, a more detailed technical description of the flowchart of FIG. 4 (the method 400) is presented. Moreover, there are two focal planes 1 and 2.

At 501, the device 100 starts the method 500.

At 502, the device 100 generate the next frame image, i.e., the next frame image I with corresponding depth map D. D is a matrix containing the depth of each pixel in the image at time t. Note that the time index is omitted for simplicity, according to following equation:

$$D(x,y) \in \{d_1, d_2\}$$

At 503, the device 100 identifies objects belonging to different focal planes. Practically, $M_1$ ($M_2$) will be 1 for each pixel which is in focal plane 1 (2), located at distance $d_1$ ($d_2$). All other elements are set to 0.

The $\delta_{d, D(x, y)}$ is the Kronecker-delta. The masks are non-overlapping masks and complete each other, that means $M_1 = \overline{M_2}$.

At 504, the device 100 generates the initial 2D images $I_1$ and $I_2$ for the focal planes 1 and 2, respectively.

At 505, the device 100 generates the one or more blurred versions, for example, the low-pass filter function LPF for pair ($I_1$, 2) is calculated by convolving the image $I_1$ with the point spread function PSFa($d_1$, $d_2$) corresponding to a blurring between focal plane distances $d_1$ and $d_2$ (roughly spreading $I_1$ onto the second focal plane). The same procedure is used to spread $I_2$ on the first focal plane, in order to obtain the LPF ($I_2$, 1).

At 506, the device 100 generates the high passed versions, for example, the LPF 2) calculated in step 505 is spread back from the second focal plane onto the first focal plane, this time using the PSFb from distance $d_2$ to $d_1$, which may be different than the previous step PSFa. The result is further subtracted from the initial 2D image $I_1$, in order to calculate the high-pass image $H_1$. The procedure is repeated for the second focal plane, with reversed indices.

At 507, the device 100 generates the final 2D images, for example, the final 2D image $I'_1$ to be displayed for the first focal plane is the combination of the high-pass image $H_1$ and the blurred contribution from the other focal plane, using the low-pass filtered image LPF($I_2$, 1) in step 505, but from which only the non-overlapping object $M_2$ is taken. The procedure is applied vice versa for the final 2D image $I'_2$.

At 508, the device 100 displays the final 2D images $I'_1$ and $I'_2$, sequentially.

Moreover, the device 100 may further proceed to step 502 and further generate the initial 2D images and the corresponding final images for the next frame corresponding with the time t+1.

Figure 6:
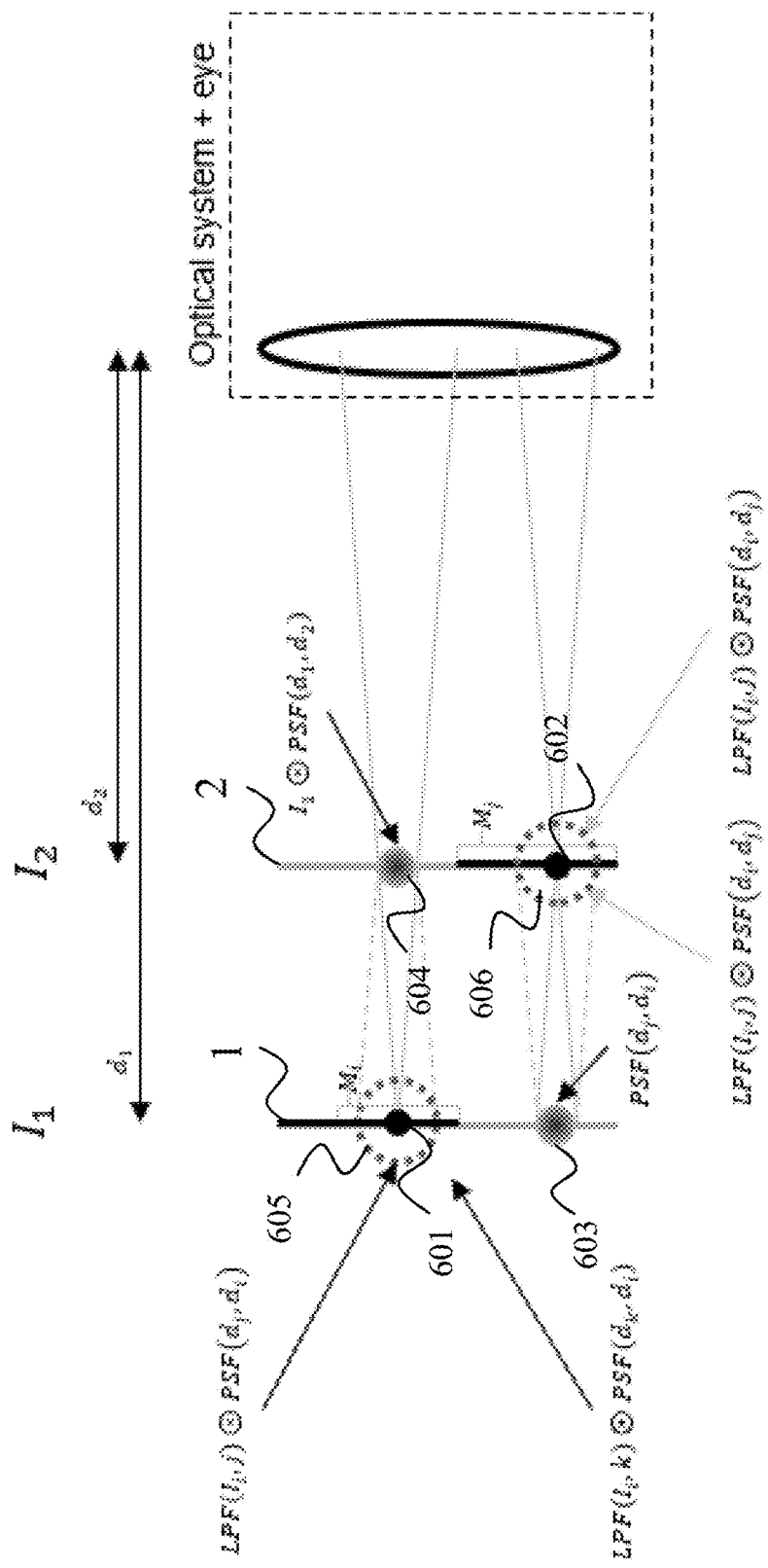
FIG. 6 schematically illustrates a filtering procedure applied to one pixel in each focal plane.

FIG. 6 schematically illustrates a filtering procedure applied to one pixel in each focal plane. The procedure 600 may be carried out by the device 100, as it is described above.

In FIG. 6, the filtering procedure applied to one pixel in each focal plane. An object 601, 602 on a particular focal plane 1, 2 is depicted as a thick black line and a pixel of interest is shown as a black dot within the line. Moreover, at the first step of the filtering, the device 100 generates the blurred version of the pixel on the other focal plane. The two straight gray lines originating from the black dot (i.e. the black dot in the black lines 601 and 602) illustrates the "spreading" process of the pixel onto the other focal plane (intermediate focal plane) 1, 2. The resulting output is a bigger circle 603, 604 including a smoothly decaying gray area illustrating the blurring process of a black dot.

At the second step, the device 100 generates the high passed versions. For example, considering the two dash lines originating from the intermediate focal plane covering the area of the bigger circle 605, 606 to the original target focal plane 1, 2. This represents the process of generating the "high passed" version of a focal plane image.

At the third step, the device 100 generates the final 2D images $I'_1$, $I'_2$ as a combination of the high passed version of the object 605, 606 and the blurred version of the area outside of the object 603, 604.

For example, for the focal plane 1 associated with the initial 2D image $I_1$ and the object 601 in the initial 2D image $I_1$ the device 100 generates the final 2D images $I'_1$ based on the high passed version of the object 605 and the blurred version of the area outside of the object 603. Moreover, for the focal plane 2 associated with the initial 2D image $I_2$ and the object 602 in the initial 2D image $I_2$ the device 100 generates the final 2D images $I'_2$ based on the high passed version of the object 606 and the blurred version of the area outside of the object 604.

Figure 7:
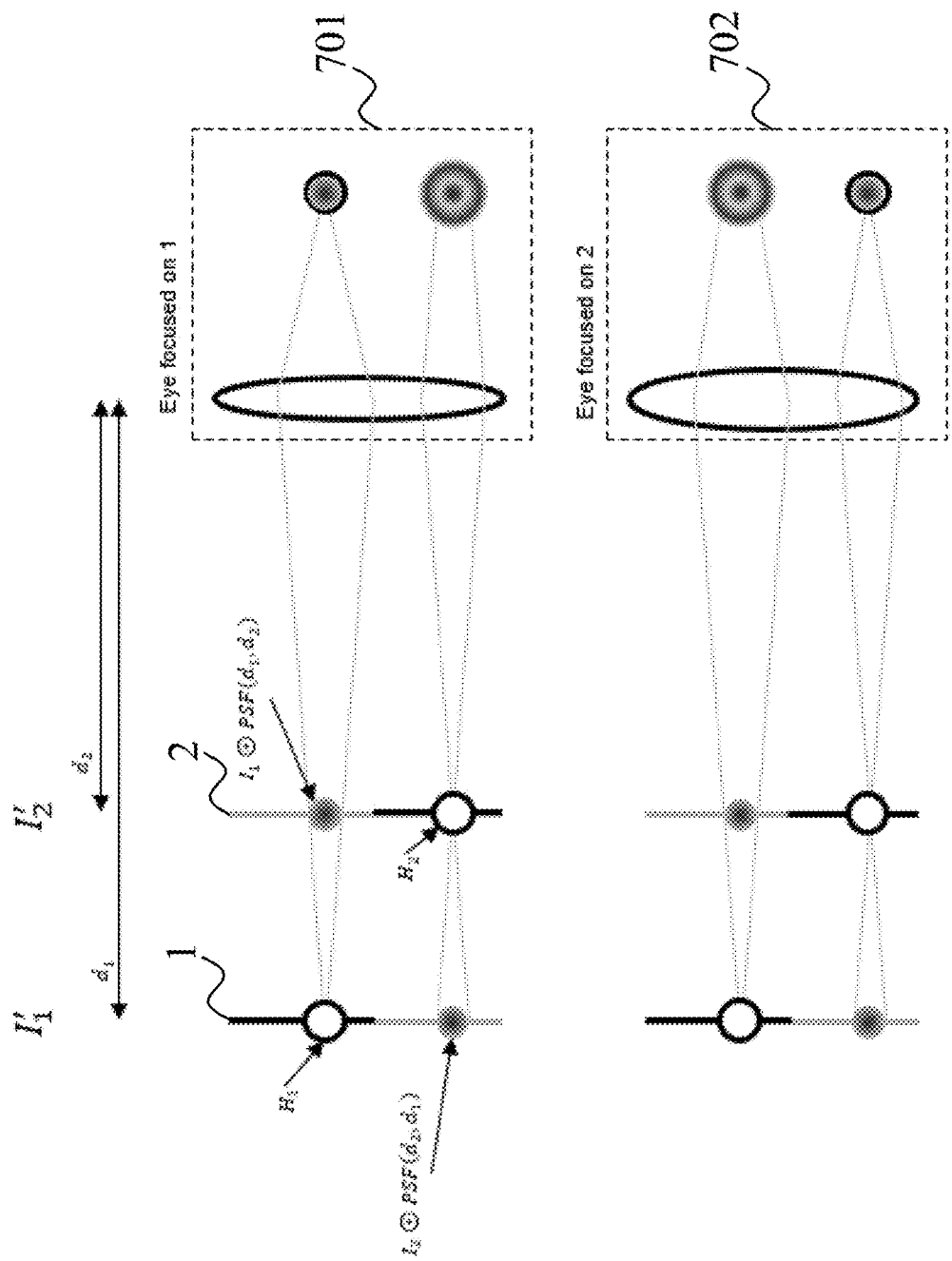
FIG. 7 illustrates exemplarily schemes of when an eye is focused on different focal planes.

FIG. 7 illustrates exemplarily schemes of when an eye is focused on different focal planes.

In 701, when the eye is focused on the focal plane 1, a focused object with the corresponding blurred version of the object on the surrounding is observed if the eye is focused on the focal plane where the object is located.

In 702, when the eye is focused on the focal plane 2, a focused object with the corresponding blurred version of the object on the surrounding is observed if the eye is focused on the focal plane where the object is located.

Figure 8:
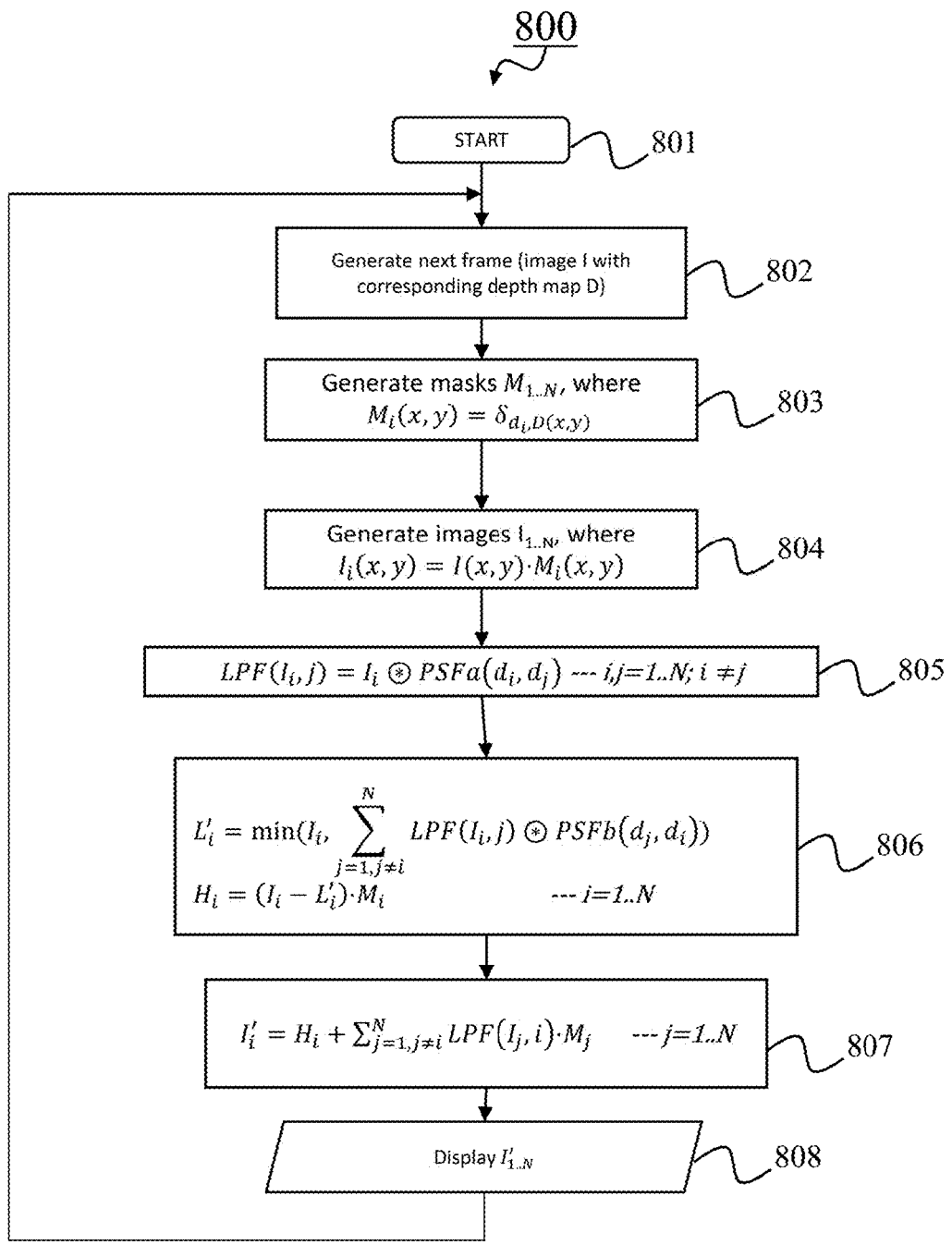
FIG. 8 schematically illustrates a flowchart of a method for generating final images for N focal planes, according to an embodiment of the invention.

FIG. 8 schematically illustrates a flowchart of a method 800 for generating final images for N focal planes, according to an embodiment of the invention. The method 800 may be carried out by the device 100, as it is described above. Moreover, N is the number of the focal planes.

At 801, the device 100 starts the method 800.

At 802, the device 100 generates the next frame image. D is a matrix containing the depth of each pixel in the 3D image, according to following equation:

$$D(x,y) \in \{d_1, d_2 \ldots d_N\}$$

At 803, the device 100 identifies objects belonging to different focal planes. Basically, $M_i$ will be 1 for a pixel which is in the focal plane i, located at distance $d_i$. All other elements are set to 0.

$\delta_{d_i, D(x, y)}$ is the Kronecker-delta. All masks $M_1 \ldots _N$ are non-overlapping masks.

At 804, the device 100 generates the initial 2D images. For example, for each focal plane i, the corresponding image $I_i$ is generated by selecting only the pixels at the depth $d_i$.

At 805, the device 100 generates the one or more blurred versions. For example, the low-pass filter function LPF for each pair ($I_i$, j) is calculated by convolving image $I_i$ with the point spread function PSFa($d_i$, $d_j$) corresponding to a blurring between focal plane distances $d_i$ and $d_j$ (for example, spreading on the other focal planes).

At 806, the device 100 generates the high passed versions. For example, the LPF calculated in step 805 is spread back using the PSFb($d_j$, $d_i$) from plane j onto plane i, obtaining the final low-pass filtered image to be subtracted from the original image $I_i$, in order to calculate the high-pass image $H_i$.

At 807, the device 100 generates the final 2D images. For example, the final image $I'_i$ to be displayed for each focal plane is the combination of the high-pass image $H_i$ and all blurred contributions from the other focal planes, using the low-pass filtered images LPF($I_j$, i) in step 805, but from which only each of their respective non-overlapping objects $M_j$ is taken.

At 808, the device 100 displays all images $I'_1 \ldots N$, sequentially.

Moreover, the device 100 may further proceed to step 802 and further generate the initial 2D images and the corresponding final images for the next frame corresponding with the time t+1.

Figure 9:
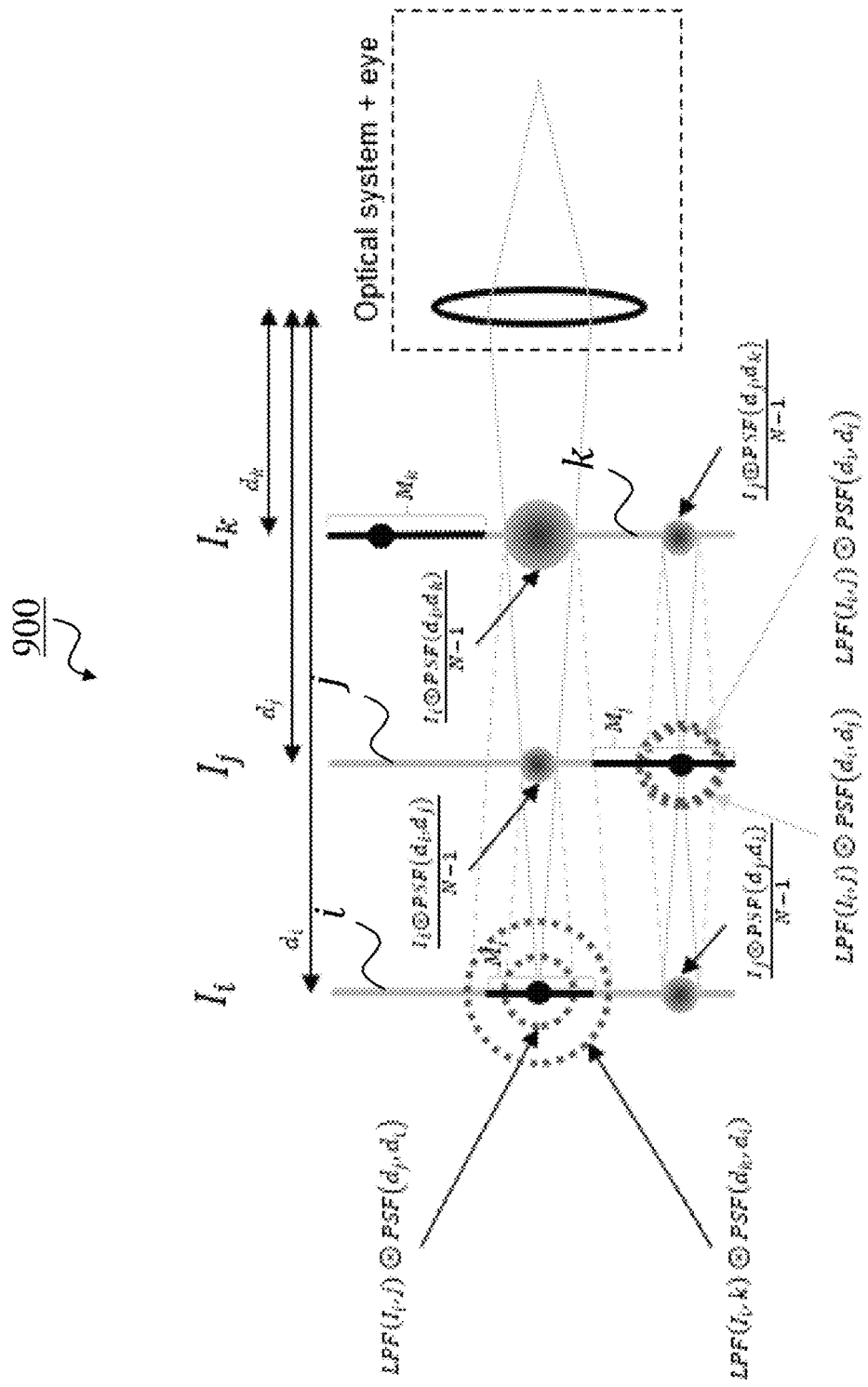
FIG. 9 schematically illustrates an exemplarily filtering procedure comprising three focal planes, according to an embodiment of the invention.

FIG. 9 schematically illustrates an exemplarily filtering procedure 900 comprising three focal planes i, j and k, according to an embodiment of the invention. The procedure 900 may be carried out by the device 100, as it is described above.

The black disk/dot in focal plane i is projected on the focal planes j and the focal plane k by computing the convolution of $I_i$ and the point spread function. The point spread function is related, for example, to what the eye may see through the optical system if it is focused on the focal plane j and only the black disc/dot would exist in the image associated with the focal plane i. This blurred image may be formed on the focal plane j by a single pixel associated with the initial 2D image of the focal i.

Figure 10:
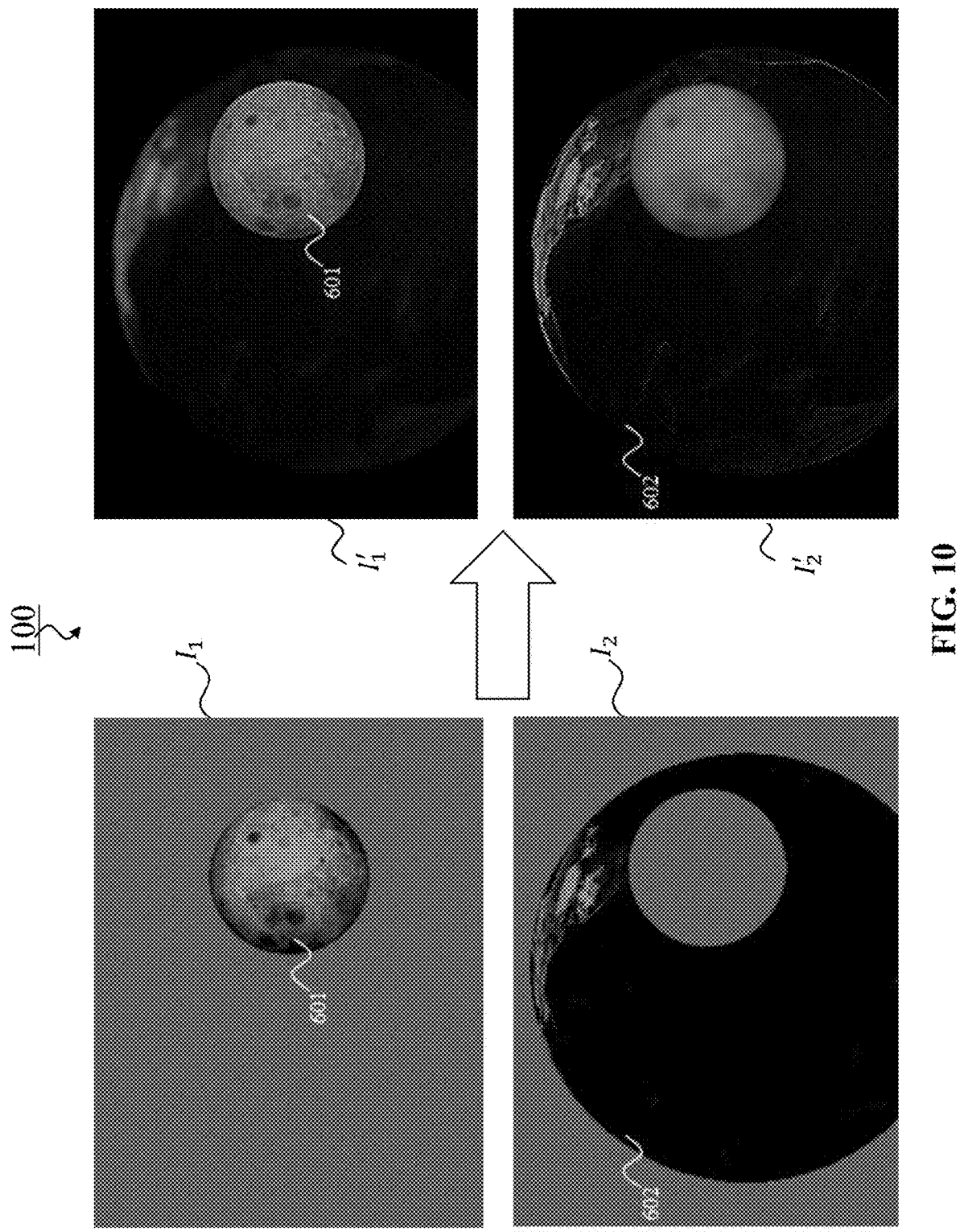
FIG. 10 schematically illustrates generating final images based on applying filtering for two focal plane images, according to various embodiments of the invention.

FIG. 10 schematically illustrates generating final images $I'_1$, $I'_2$ based on applying filtering for two focal plane images, according to various embodiments of the invention. The device 100, as it is described above, may generates the final 2D images $I'_1$, $I'_2$.

In FIG. 10, the filtering results applied on two initial 2D images (focal plane images) $I_1$, $I_2$ (top and below). The initial 2D image $I_1$ (top left) denotes an object 601 on focal plane 1 on a uniform gray background and the final 2D image $I'_1$ (top right) shows what a user of the MFD may see when focusing on focal plane 1 after performing the proposed filtering process.

Similarly, the initial 2D image $I_2$ (below left) denotes an object 602 on focal plane 2 on a uniform gray background and the final 2D image $I'_2$ (below right) shows what a user of the MFD may see when focusing on focal plane 2 after the proposed filtering. Note that the gray background is merely used for illustration purpose.

Figure 11:
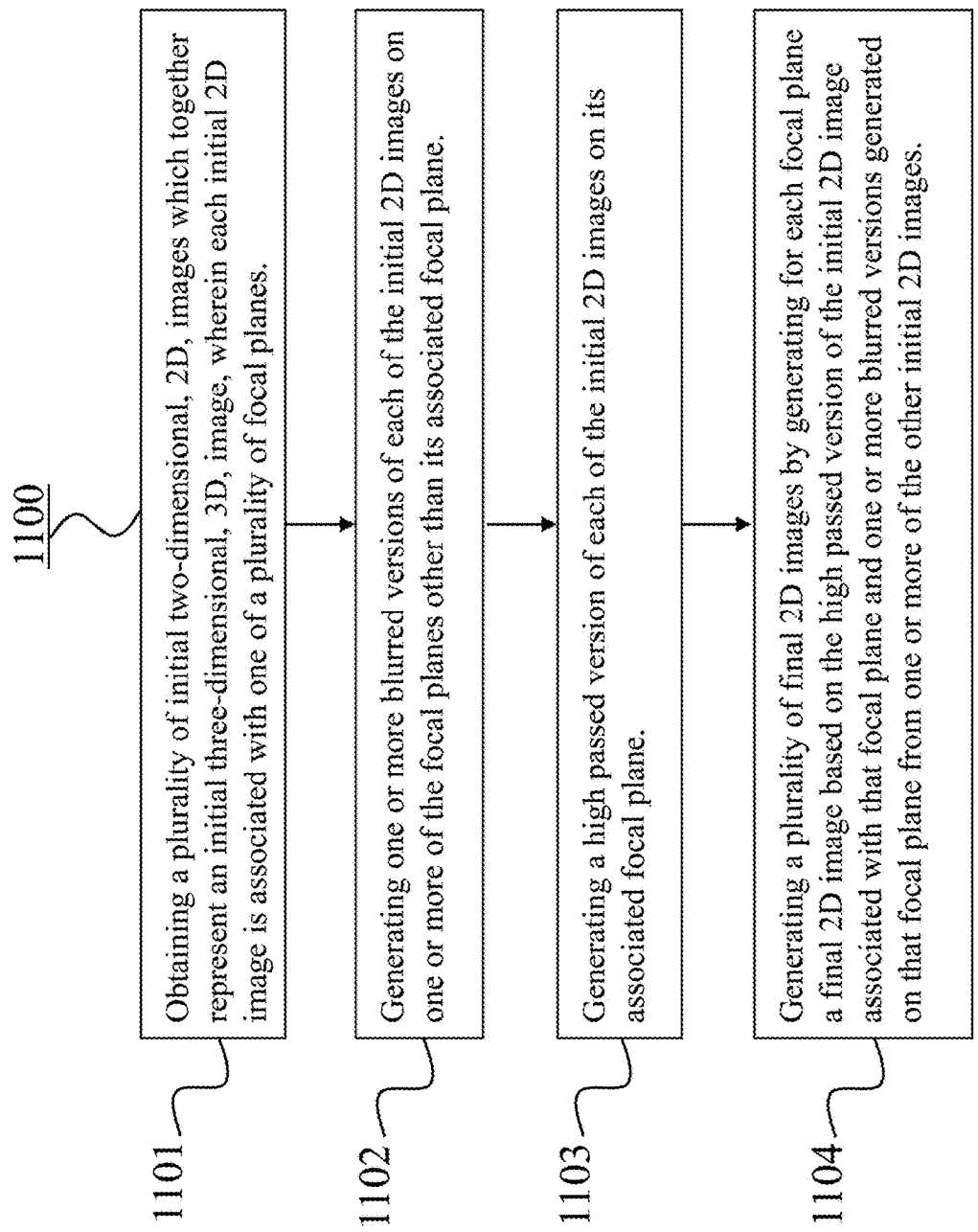
FIG. 11 schematically illustrates a method, according to an embodiment of the invention.
Figure 12:
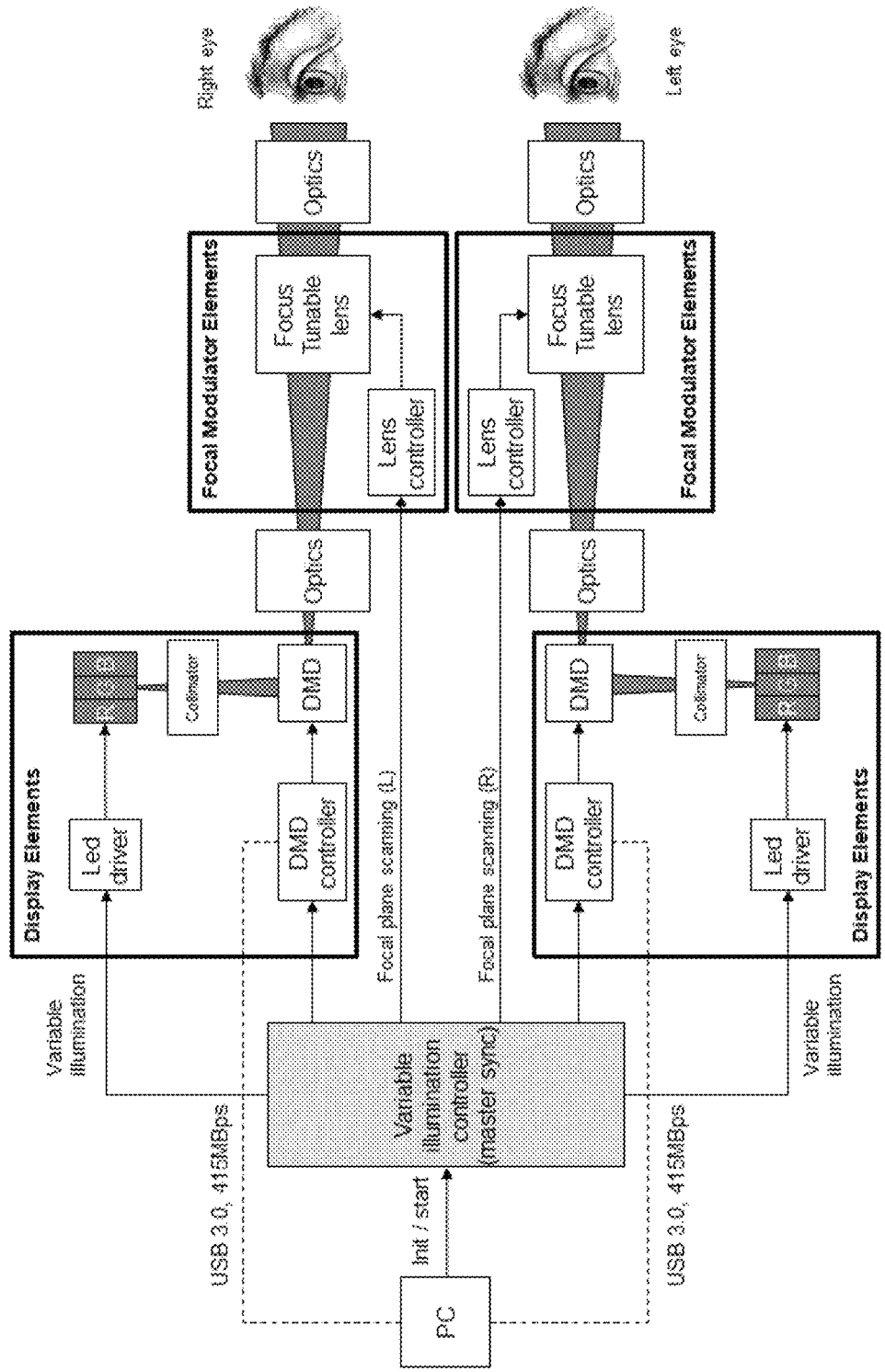
FIG. 12 schematically illustrates an exemplary MFD device.
Figure 13:
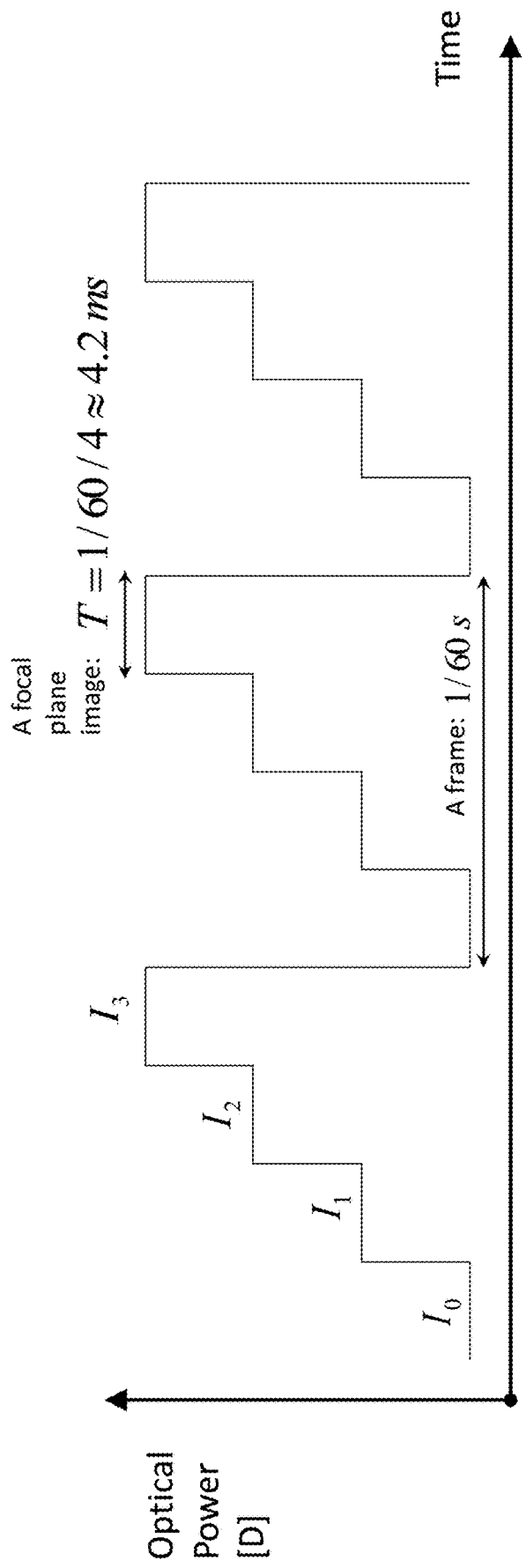
FIG. 13 schematically illustrates an optical power of a focus tunable lens over time for four focal planes of different index.

FIG. 11 shows a method 1100 according to an embodiment of the invention. The method 1100 may be carried out by the device 100, as it is described above.

The method 1100 comprises a step 1101 of obtaining a plurality of initial two-dimensional, 2D, images $I_1$, $I_2$ which together represent an initial three-dimensional, 3D, image I, wherein each initial 2D image $I_1$, $I_2$ is associated with one of a plurality of focal planes 1, 2.

The method 1100 further comprises a step 1102 of generating one or more blurred versions LPF ($I_1$, 2), LPF ($I_2$, 1) of each of the initial 2D images $I_1$, $I_2$ on one or more of the focal planes 1, 2 other than its associated focal plane 1, 2.

The method 1100 further comprises a step 1103 of generating a high passed version $H_1$, $H_2$ of each of the initial 2D images $I_1$, $I_2$ on its associated focal plane 1, 2.

The method 1100 further comprises a step 1104 of generating a plurality of final 2D images $I'_1$, $I'_2$ by generating for each focal plane 1, 2 a final 2D image $I'_1$, $I'_2$ based on the high passed version $H_1$, $H_2$ of the initial 2D image $I_1$, $I_2$ associated with that focal plane 1, 2 and one or more blurred versions LPF ($I_1$, 2), LPF ($I_2$,1) generated on that focal plane 1, 2 from one or more of the other initial 2D images $I_1$, $I_2$.

The present embodiments have been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device comprising circuitry configured to:
   obtain a plurality of initial two-dimensional, 2D, images which together represent an initial three-dimensional, 3D, image, wherein each initial 2D image is associated with one of a plurality of focal planes, wherein an object in an initial 2D image associated with a given focal plane among the plurality of focal planes is identified based on the object having a predefined intensity;
   generate one or more blurred versions of each of the plurality of initial 2D images on one or more of the focal planes other than its associated focal plane;
   generate a high passed version of each of the plurality of initial 2D images on its associated focal plane; and
   generate a plurality of final 2D images by generating for each focal plane a final 2D image based on the high passed version of the initial 2D image associated with that focal plane and the one or more blurred versions generated on that focal plane from one or more of the other initial 2D images.

2. A device according to claim 1, wherein
   a superposition of the plurality of final 2D images is visually identical or similar to a superposition of the plurality of initial 2D images.

3. A device according to claim 1, wherein
   the one or more blurred versions of a determined initial 2D image are generated by applying an inter focal plane filtering in order to reduce the contrast between at least two generated final 2D images associated with successive focal planes.

4. A device according to claim 1, wherein
   the high passed version of a determined 2D image associated with its determined focal plane is generated based on the generated one or more blurred versions of the determined 2D image.

5. A device according to claim 1, wherein the circuitry is further configured to:
   generate the final 2D image for the given focal plane using the high passed version of the initial 2D image for the area corresponding to the object, and further using the one or more blurred versions generated from the one or more of other initial 2D images for the area outside of the object.

6. A device according to claim 1, wherein the circuitry is further configured to
   display sequentially the generated final 2D images, each being displayed at its associated focal plane, wherein the final 2D images together representing a final 3D image.

7. A device according to claim 1, wherein the circuitry is further configured to
   generate the plurality of initial 2D images based on the initial 3D image.

8. A device according to claim 1, further configured to determine a depth map based on the initial 3D image.

9. A device according to claim 8, wherein the circuitry is further configured to:
   generate, based on the depth map, a plurality of masks, each mask being associated with one of the plurality of focal planes, and
   generate the plurality of initial 2D images based on applying the plurality of masks on the initial 3D image.

10. A method comprising:
    obtaining a plurality of initial two-dimensional, 2D, images which together represent an initial three-dimensional, 3D, image, wherein each initial 2D image is associated with one of a plurality of focal planes, wherein an object in an initial 2D image associated with a given focal plane among the plurality of focal planes is identified based on the object having a predefined intensity;
    generating one or more blurred versions of each of the plurality of initial 2D images on one or more of the focal planes other than its associated focal plane;
    generating a high passed version of each of the plurality of initial 2D images on its associated focal plane; and
    generating a plurality of final 2D images by generating for each focal plane a final 2D image based on the high passed version of the initial 2D image associated with that focal plane and the one or more blurred versions generated on that focal plane from one or more of the other initial 2D images.

11. A non-transitory computer-readable recording medium that stores therein a computer program which, when executed by a processor, causes the method according to claim 10 to be performed.

* * * * *